(12) United States Patent
Hoff et al.

(10) Patent No.: US 9,582,257 B2
(45) Date of Patent: Feb. 28, 2017

(54) PACKAGE DESIGN AND GENERATION

(71) Applicant: Microsoft Corporation, Redmond, WA (US)

(72) Inventors: Phillip Michael Hoff, Duvall, WA (US); Shi Sun, Redmond, WA (US); Daniel A. Molina, Bellevue, WA (US); Li Ma, Bellevue, WA (US); Lubomir I. Birov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/175,170

(22) Filed: Feb. 7, 2014

(65) Prior Publication Data

US 2014/0157254 A1  Jun. 5, 2014

Related U.S. Application Data

(63) Continuation of application No. 13/858,093, filed on Apr. 8, 2013, now Pat. No. 8,661,427, which is a continuation of application No. 12/472,380, filed on May 27, 2009, now Pat. No. 8,418,165.

(51) Int. Cl.
  *G06F 9/44*    (2006.01)
  *G06F 9/445*   (2006.01)
  *G06F 3/00*    (2006.01)

(52) U.S. Cl.
  CPC ............ *G06F 8/60* (2013.01); *G06F 8/61* (2013.01); *G06F 8/62* (2013.01); *G06F 3/00* (2013.01)

(58) Field of Classification Search
  CPC ..... G06F 3/00; G06F 8/60; G06F 8/61; G06F 8/62
  USPC .......................... 717/168, 105, 109, 114, 133
  See application file for complete search history.

(56) References Cited

U.S. PATENT DOCUMENTS

| | | | |
|---|---|---|---|
| 7,216,324 B2 | 5/2007 | Chang | |
| 7,565,635 B2 | 7/2009 | Chao et al. | |
| 7,634,771 B2 | 12/2009 | Benjes et al. | |
| 7,650,588 B2 | 1/2010 | Ivansen | |
| 7,761,601 B2 | 7/2010 | Falkenburg et al. | |
| 2003/0035005 A1 | 2/2003 | Kodosky et al. | |
| 2004/0216048 A1 | 10/2004 | Brown et al. | |
| 2004/0268298 A1* | 12/2004 | Miller et al. | 717/106 |
| 2005/0198631 A1 | 9/2005 | Bisher et al. | |

(Continued)

OTHER PUBLICATIONS

"WSPBuilder", Retrieved at <<http://www.codeplex.com/wspbuilder>>, Apr. 2, 2009, p. 1.

(Continued)

*Primary Examiner* — Idriss N Alrobaye
*Assistant Examiner* — Getente A Yimer
(74) *Attorney, Agent, or Firm* — Kevin Sullivan; Kate Drakos; Micky Minhas

(57) ABSTRACT

Solution packages for a product for deployment on a collection of servers can be designed using one or more designers that provide user interfaces for visually arranging and configuring elements of the product. A package object model includes a managed object model that represents a package or feature manifest as defined by a product manifest XML schema. The object model can be used to create references to other project item and feature definitions. The extended object model can be used to generate an equivalent package or feature manifest XML file.

17 Claims, 5 Drawing Sheets

(56) References Cited

U.S. PATENT DOCUMENTS

| | | | |
|---|---|---|---|
| 2006/0048108 A1* | 3/2006 | Ushiku | 717/136 |
| 2006/0282252 A1 | 12/2006 | Ciolfi | |
| 2007/0234277 A1* | 10/2007 | Lei et al. | 717/104 |
| 2007/0261017 A1 | 11/2007 | Sanghvi et al. | |
| 2007/0271552 A1 | 11/2007 | Pulley | |
| 2007/0294074 A1 | 12/2007 | Ciolfi | |
| 2008/0127057 A1* | 5/2008 | Costa et al. | 717/106 |
| 2008/0209392 A1* | 8/2008 | Able et al. | 717/105 |
| 2008/0262823 A1 | 10/2008 | Oslake et al. | |
| 2009/0077111 A1 | 3/2009 | Petri | |
| 2009/0265683 A1* | 10/2009 | Salgar et al. | 717/104 |

OTHER PUBLICATIONS

Connell, Andrew, "Automating Solution Package Creation for Windows SharePoint Services by using MSBuild", Retrieved at <<http://msdn.microsoft.com/en-us/library/cc441431.aspx>>, Apr. 2008, pp. 2.

Bowden, Eric, "SharePoint Features—Scope of Deployment", Retrieved at <<http://wiki.threewill.com/display/is/2008/10/02/SharePoint+Features+-+Scope+of+Deployment>>, Dec. 19, 2008, pp. 2.

"Sharepoint List Attachments in a Webpart: The Solution", Retrieved at <<http://www.pointsharepoint.com/search/label/SharePoint%20Object%20Model>>, Apr. 2, 2009, pp. 16.

Svansson, et al., "A Web Specific Language for Content Management Systems", Retrieved at <<http://www.dsmforum.org/events/DSM07/papers/svansson.pdf>>, pp. 10.

Visser, Eelco, "Domain-Specific Language Engineering", Retrieved at <<http://swerl.tudelft.nl/twiki/pub/Main/TechnicalReports/TUD-SERG-2007-017.pdf>>, pp. 58.

Shustef, Eugene, "Visual Studio 2008", Retrieved at <<http://download.microsoft.com/download/6/6/2/662f9817-de68-46e3-91f7-e7323878ef78/Xerox_VS2008.doc>>, Dec. 2007, pp. 3.

"International Search Report", Mail Date: Dec. 27, 2010, Application No. PCT/US2010/036488, Filed date: May 27, 2010, pp. 9. (Matter No. 327222.02).

Non-Final Office Action, U.S. Appl. No. 12/427,380, mailing date Jun. 25, 2012, pp. 13.

Notice of Allowance, U.S. Appl. No. 12/427,380, mailing date Jan. 1, 2013, pp. 18.

"Supplementary European Search Report", Mailed Date: Nov. 5, 2012, Application No. 10781248.9 Filed Date: May 27, 2010, pp. 06.

Notice of Allowance, U.S. Appl. No. 13/858,093, mailing date Jul. 25, 2013, pp. 14.

Notice of Allowance, U.S. Appl. No. 13/858,093, mailing date Oct. 11, 2013, pp. 9.

"Office Action Issued in Chinese Patent Application No. 201080023852.2", Mailed Date: Jan. 9, 2014, 5 Pages.

"Office Action Issued in European Patent Application No. 10781248.9", Mailed Date: Jun. 29, 2015, 4 Pages.

"Fourth Office Action Issued in Chinese Patent Application No. 201080023852.2", Mailed Date: Mar. 16, 2016, 6 pages.

\* cited by examiner

PACKAGE DESIGN AND GENERATION

CROSS REFERENCE TO RELATED APPLICATIONS

This application is a continuation of and claims the benefit of and priority to U.S. patent application Ser. No. 13/858,093, entitled "Package Design And Generation", filed Apr. 8, 2013 by Phillip Michael Hoff, et. al., the entire contents of which are expressly incorporated by reference. That application is a continuation of and claims the benefit of and priority to U.S. patent application Ser. No. 12/472,380, entitled "Package Design And Generation", filed May 27, 2009 by Phillip Michael Hoff, et. al., U.S. Pat. No. 8,418,165, the entire contents of which are expressly incorporated by reference.

BACKGROUND

When deploying applications to a number of locations or when some of the deployed files encode the relationships between the files, it is usually not recommended to simply copy files from one location to another. Instead, it is often better to create and deploy packages. A package is a set of code files and other resources that are used to create an application. Often, creating packages for deployment is a complex task that involves a variety of tools and involves labor-intensive, error-prone tasks such as hand-editing complex documents and maintaining long lists of files to be included in the package. For example, application and server platforms often have very specific and complex standards for the deployment and installation of new components that make manually creating packages difficult.

SUMMARY

User interfaces for visually arranging and configuring software packages and an object model for representing the software package is provided for designing and generating software packages for deployment on a collection of server computers. The object model is generated using a domain specific language (DSL). The object model is exposed to a managed extensibility platform and allows project extensions to manipulate a package outside of the user interfaces. A package design and generation tool can be employed to customize packages, to determine and collect all the files needed for the package, to generate a manifest that indicates where each of the files will reside on the web server, and to bundle all these components into a package solution in the expected format for deployment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Microsoft SharePoint is a collection of products and software elements that comprise a server development platform that includes browser-based collaboration functions, process management modules, search modules and a content management platform. SharePoint is a web server application that can be used to create and host one or more web sites that access shared workspaces, information stores and documents. SharePoint can also be used to host defined applications such as web workflows, wilds, blogs and so on. SharePoint is an application built on top of a web server that facilitates the creation of individual sites on a number of servers that house libraries of documents, lists and data, etc., accessible via a web interface in a browser.

Currently, to create a SharePoint solution package for deployment to a collection of web servers, a user has to manually perform a number of steps that are both labor-intensive and error-prone. First, the user creates a new project in his integrated development environment. He then adds web pages, web parts, template files, code and so on. These files are added in a particular folder structure that matches their ultimate location within the software package. Next, he creates additional manifest files which indicate to SharePoint how the files within the software package should be deployed. He then creates a directive file which indicates to the compression tool which files to include in the software package.

In accordance with aspects of the subject matter disclosed herein, a package design and generation tool is provided that enables the user to customize the appearance and layout of elements of a software package. For example, the package design and generation tool can be employed to include a customized workflow in a particular feature of the package, to determine and collect all the files needed for the workflow, to generate a manifest that indicates where each of the files will reside on the web server, and to bundle all these components into a package solution in the expected format for deployment. It will be appreciated that while the subject matter disclosed herein is described within the specific setting of SharePoint, the subject matter or aspects thereof can be applied to any software created for deployment on a collection of servers.

Package Design and Generation

Figure 1A:
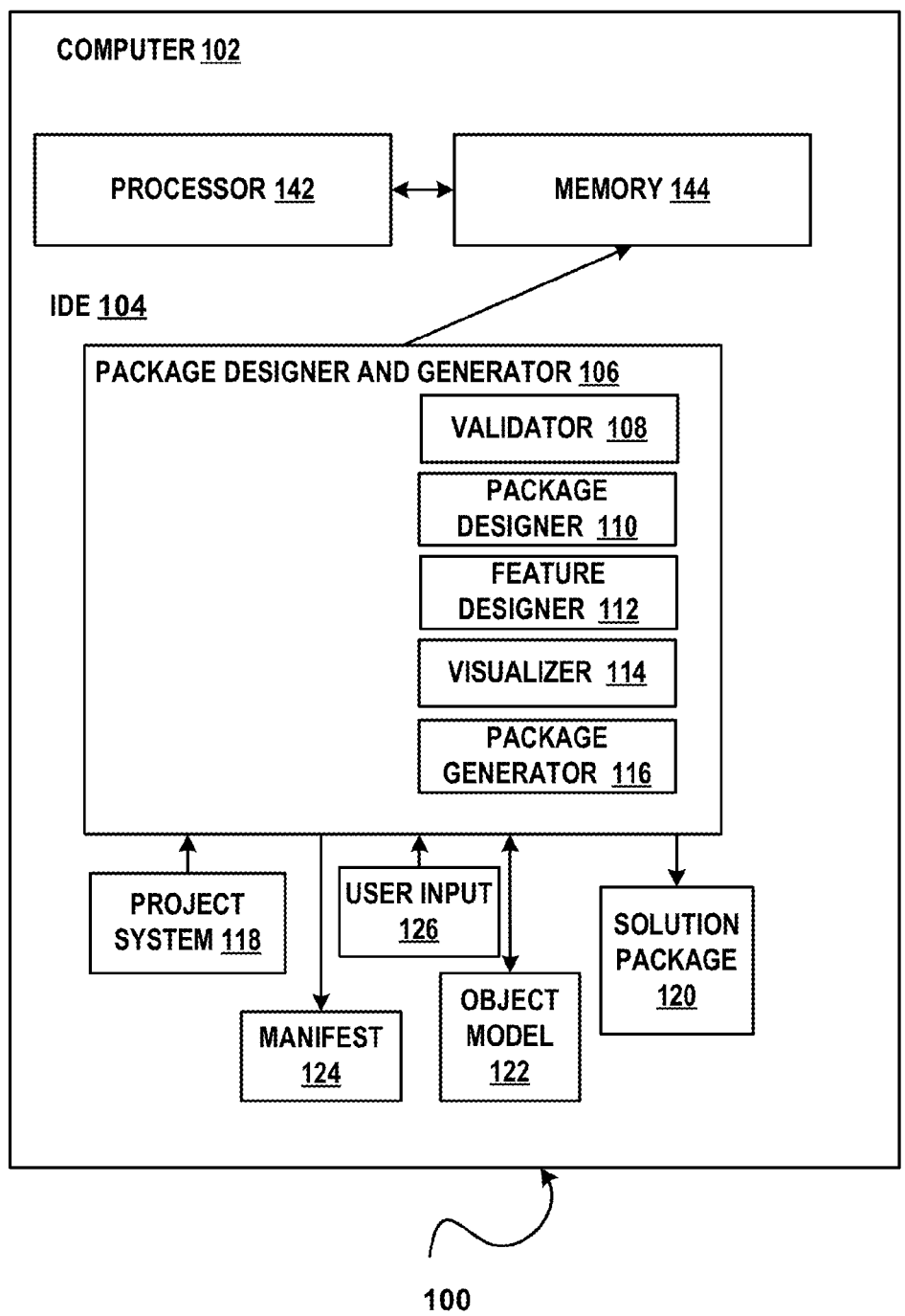
FIG. 1a is a block diagram of an example of a system for package design and generation in accordance with aspects of the subject matter disclosed herein.

FIG. 1a illustrates an example of a system 100 for software package design and generation in accordance with aspects of the subject matter disclosed herein. All or portions of system 100 may reside on one or more computers such as the computers described below with respect to FIG. 3. All or portions of system 100 may reside on one or more software development computers (e.g., computer 102) such as the computers described below with respect to FIG. 4. The system 100 or portions thereof may comprise a portion of an integrated development environment (e.g., IDE 104) such as the ones described and illustrated below with respect to FIG. 4. Alternatively, system 100 or portions thereof may be provided as a stand-alone system or as a plug-in or add-in.

System 100 may include one or more of: a processor (such as processor 142), a memory 144, and a software package designer and generator 106. Other components well known in the arts may also be included but are not here shown. It will be appreciated that software package designer and generator 106 can be loaded into memory 144 to cause one or more processors such as processor 142 to perform the actions attributed to the software package designer and generator 106. Software package designer and generator 106, in accordance with aspects of the subject matter disclosed herein, may receive a project system 118 input and produce a solution package 120 for deployment. Software package designer and generator 106 may receive a package definition file and produce a customized package definition in response to user input.

Software package designer and generator 106 (which can also be referred to as a software package design and generation tool or software package design and generation module) can include one or more of the following: a validator represented in FIG. 1a by validator 108, a package designer represented in FIG. 1a by package designer 110, a feature designer represented in FIG. 1a by feature designer 112, a visualizer represented in FIG. 1a by visualizer 114, a package generator represented in FIG. 1a by package generator 116 and an object model represented in FIG. 1a by object model 122. In operation, software package designer and generator 106 may receive project system 118 and produce solution package 120. A manifest 124 can also be generated. Manifests include package manifests (which list the features in the package, among other things), feature manifests (which list the project items in the feature), and element manifests (which list the individual files that make up the project item). A user's customized manifest may be merged with a package-provided manifest to produce a merged manifest that is included in the solution package 120. Solution package 120 can represent any software including software deployed to a collection of server computers such as a collaborative server application such as but not limited to Microsoft's SharePoint.

Validator 108 checks for errors that would prevent creation of a correct or working solution package 120. In accordance with some aspects of the subject matter disclosed herein, before the rest of the packaging process commences, a series of rules are executed. Each rule or combination of rules in the set of validation rules may check a particular component in the package. For example, one rule may check that there are no duplicate project items in the same feature. Another example of a rule may check for compatibility between the project item and the feature in which the project item is placed. If a rule is violated, an appropriate error or warning can be reported to the user, visually on a display or in printed form. The errors or warnings can be received by the user who then has an opportunity to make changes to package components using the designers. Rules can be extensible. Rules can target individual features or the package as a whole. The validator 108 can use the managed extensibility framework (MEF) to locate and instantiate a "core" set of rules shipped with the product as well as additional rules defined by third parties via a public application programming interface (API).

The package design and generation tool 106 can include designers for arranging and configuring packages and features. A package designer can be used to configure features within a package, combine combinations of features into the package, set properties on the package, visualize defined features in the project, add a feature to the package, remove a feature from the package, resort features within the package, modify aspects of a future installation of the package, or modify an uninstallation of the package and so on, based on directives received from user input. A feature designer based on user input can configure project items within a feature, combine combinations of project items into a feature, set properties on a feature, visualize defined project items in the project, add a project item to a feature, remove a project item from a feature.

In accordance with some aspects of the subject matter disclosed herein, the designers are Microsoft Visual Studio designers that visually arrange and configure SharePoint packages and features via drag and drop operations, click and drop or via other well-known methodologies. A user can customize an object model via the designers by adding or removing defined elements in the object model. The designers can be built atop a domain-specific language designer. A domain-specific language or DSL is a programming language or specification language dedicated to a particular problem domain, a particular problem representation technique, and/or a particular solution technique. The designers may, but do not necessarily, use the design surface associated with the DSL. Instead, these designers may integrate UI (user interface) elements based on a different UI technology such as but not limited to Windows Presentation Foundation (WPF) with the DSL UI framework and may embed WPF-based UI elements. The UI elements presented to the user when a designer is opened may be extensible. For example, the Managed Extensibility Framework (MEF) can be used to identify and instantiate, from the set of all views in the system, only the set of views associated with a particular component (e.g., package or feature) within the package object model.

Package designer 110 receives user input 126 provided to arrange features within a package, to combine combinations of features into a package, to set properties on packages, to see the defined features in the project, to add or remove features from the package, to resort features within the package, to modify the way the installation or uninstallation of a package is handled (e.g., a user can change the order in which features included in the package are activated when the package is installed on the server, etc.) and so on to customize packages. Feature designer 112 receives user input 126 provided to arrange project items within a feature, to set properties on features, to see the defined project items in the project, to add or remove project items from the feature and to customize project items, to modify the way the installation or uninstallation of a feature is handled and so on. In accordance with aspects of the subject matter disclosed herein, when changes are made via the designers, the changes are made to an object model 122. When the changes to the object model are saved the changes to the object model are converted back into a serialized format (e.g., such as but not limited to an XML file).

The software package designer and generator 106 can include a visualizer 114 that displays the structure of the packages in a view. For example, in accordance with some aspects of the subject matter disclosed herein, the visualizer 114 is a Visual Studio tool window that displays the structure of the SharePoint packages in a tree view. The user can select an item within the tool window and view and/or change its settings in a Visual Studio properties window. The user can also move items from one location in a SharePoint package to another using a drag and drop or click and drag operation or via any well known technique.

The software package designer and generator 106 can include a package generator 116 that generates the software package 120. For example, a package generator such as package generator 116 can extend the project build process in order to allow a user to generate the SharePoint package designed in the designers described above. Custom MSBuild tasks and targets can automatically extract the SharePoint package and feature definitions, use the definitions to generate the appropriate package and feature manifest XML files (e.g., manifest 124), and bundle them with associated project item files into a format (such as but not limited to a compressed format having the .wsp extension) expected by SharePoint deployment software on the collection of servers to which the solution package is deployed. Package generation can be executed via menu items within Visual Studio or on the command line. Packaging is described more fully below with respect to FIG. 2a.

An object model such as object model 122 can represent one or more packages of the project. The object model 122 may represent a managed object model that represents one or more SharePoint packages, or features. The object model may be modeled after manifest schemas such as the SharePoint manifest XML schemas. The object model can be defined and generated using a Domain Specific Language (DSL) framework. Instances of elements of the object model can be added and/or removed via the designers described above. Other components such as definitions and project items including but not limited to other SharePoint feature definitions and project items both within the current project and well as within other projects in the IDE, can be referenced, as described more fully below with respect to FIG. 1b. For example, components within the current Visual Studio project as well as in those in other projects in the Visual Studio solution may be referenced. The object model so defined can be used to generate an equivalent package component (e.g., an equivalent SharePoint package or feature manifest XML file) by mapping types and properties in the object model to elements and attributes in a manifest XML schema. Additionally, an instance of the object model can be created from an existing package or feature manifest file. Transformation between files and object model is described in more detail below with respect to FIG. 2b.

Figure 1B:
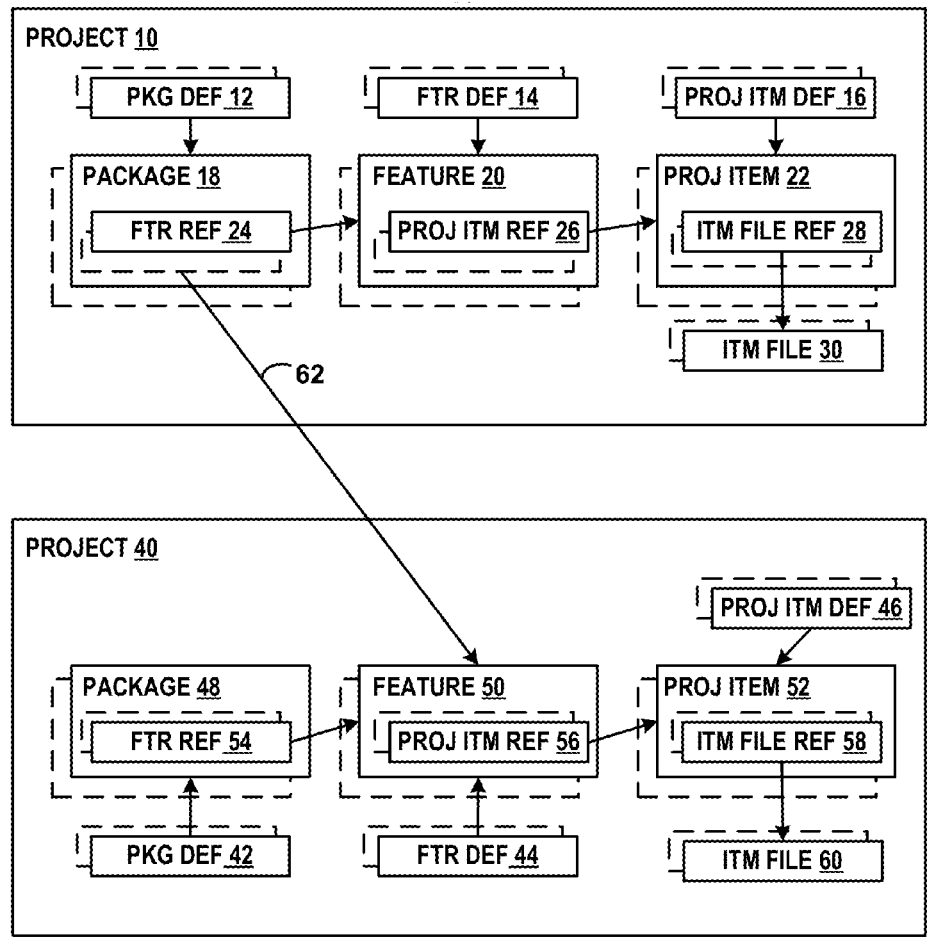
FIG. 1b is a block diagram of an example of a structure for the package of FIG. 1a in accordance with aspects of the subject matter disclosed herein.

FIG. 1b illustrates a high level view of the structure of a project 10 and a project 40. The project 10 can include one or more package definitions such as package definition 12, etc., one or more feature definitions such as feature definition 14, etc., and one or more project item definitions such as project item definition 16, etc. Project 10 can also include one or more packages such as package 18, etc. defined by package definition 12, etc., one or more features such as feature 20, etc. defined by feature definition 14, etc., one or more project items such as project item 22, etc. defined by project item definition 16, etc. Package 18, etc. may include one or more references to features such as feature reference 24, etc. Feature reference 24, etc. may point to or reference feature 20, etc. Similarly, feature 20 may include one or more references to project items such as project item reference 26, etc. Project item reference 26, etc. may point to or reference project item 22, etc. Project item 22, etc. may include one or more references to files such as item file reference 28, etc. Item file reference 28, etc. may point to or reference a file such as item file 30.

Similarly, project 40 can include one or more package definitions such as package definition 42, etc., one or more feature definitions such as feature definition 44, etc. and one or more project item definitions such as project item definition 46, etc. Project 40 can also include one or more packages such as package 48, etc. defined by package definition 42, etc., one or more features such as feature 50, etc. defined by feature definition 44, etc., one or more project items such as project item 52, etc. defined by project item definition 46, etc. Package 48, etc. may include one or more references to features such as feature reference 54, etc. Feature reference 54, etc. may point to or reference feature 50, etc. Similarly, feature 50 may include one or more references to project items such as project item reference 56, etc. Project item reference 56, etc. may point to or reference project item 52, etc. Project item 52, etc. may include one or more references to files such as item file reference 58, etc. Item file reference 58, etc. may point to or reference a file such as item file 60.

As described above, the project can include one or more project items. A project item such as project item 22 can be one of many kinds of tangible byproducts produced during the development of an application. An project item can be one of a set of components (extensions), some of which can be shipped with the product (e.g. web part, list definition, content type, etc.) and which can be added to by a third party. Files, such as project item file 60, that are referenced in the project item can be any appropriate file including but not limited to an element manifest, a schema, a bit map image, a document and so on.

A feature reference in a package in project 10 can reference a feature in project 40 (indicated by line 62 in FIG. 1b) and vice versa. A project item referenced in project 10 can reference files within its parent, e.g. project 10. A project such as project 10 or project 40 can be any software created for deployment on a collection of servers. More particularly, a project can be a collaborative server application such as but not limited to a SharePoint application as described above. The package definition refers to one or more features that may reside in the current project or may be in another project in the solution. The feature similarly has references to one or more of the project items that are included in the solution either in the current project or in another project in the solution. A project item such as project item 22, etc. may include a number of files, each of which has to go to a particular location on a server in the collection of servers.

Figure 2B:
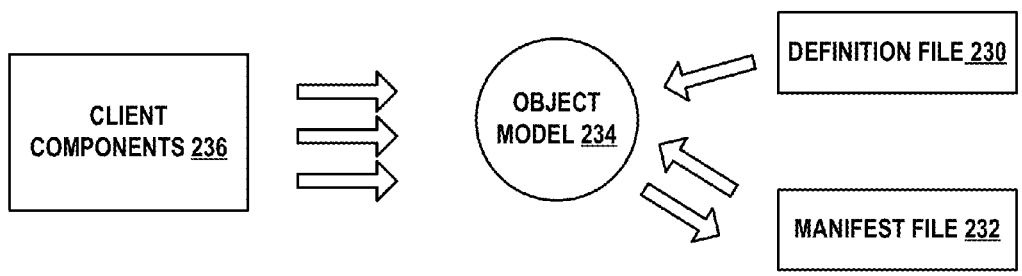
FIG. 2b is a block diagram of an example showing the flow of data in a process for deserialization of data to an object model and to serialization of an object model to data as referenced in FIGS. 1a, 1b and 2a in accordance with aspects of the subject matter disclosed herein.
Figure 2A:
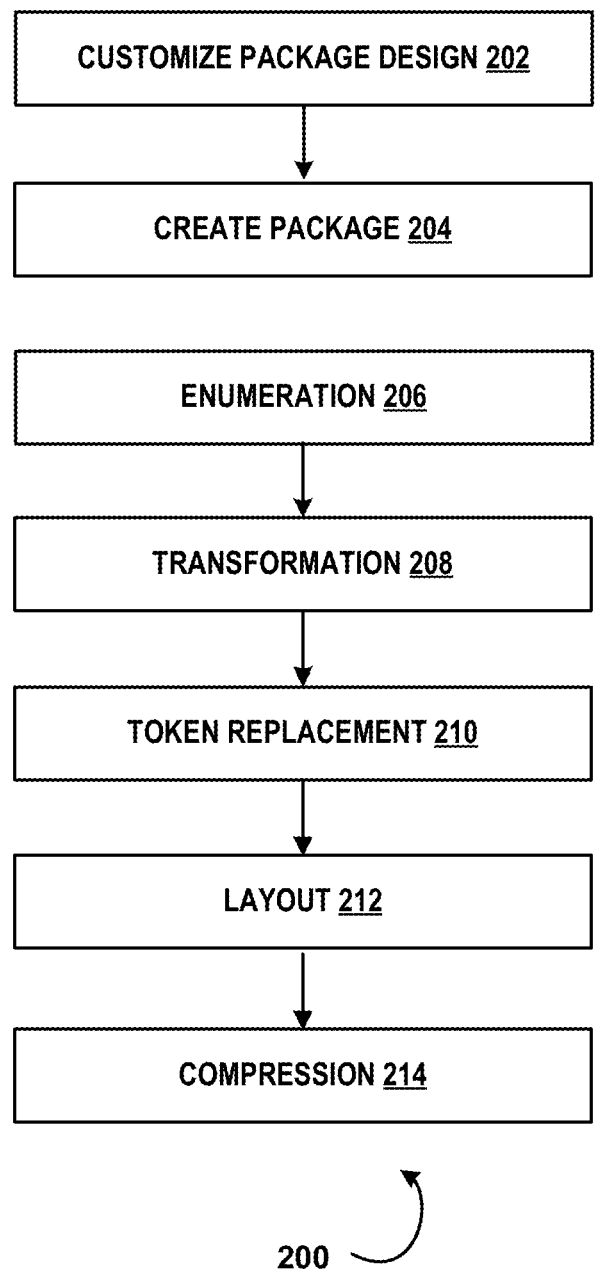
FIG. 2a is a flow diagram of an example of a method for package design and generation in accordance with aspects of the subject matter disclosed herein.

FIG. 2a illustrates an example of a method 200 for package design and generation in accordance with aspects of the subject matter disclosed herein. In accordance with some aspects of the subject matter disclosed herein, the input to method 200 is a project created using a project system. The project can be a software project such as but not limited to a project that will be deployed to a collection of servers. The collection of servers can be maintained by an enterprise to accomplish server needs beyond the capability of one machine. Server farms are commonly used for cluster computing. One common type of server farm is one used for web hosting. A farm of this type is sometimes referred to as a web farm.

Once the individual project items of a software application have been created method 200 can be called. Method 200 in accordance with some aspects of the subject matter disclosed herein receives a project to be used by a development environment including but not limited to Visual Studio. The project can include logic for workflows, defined list definitions and so on. Once the project has been loaded, customization of the design of the software package can commence at 202.

Customization can be performed using the designers described above. It will be appreciated that customization, with or without the use of the designers, is an optional step. That is, if, for example, the package design is already in a desired state, no customization has to be performed before package creation at 204. Creating the package may comprise creating a single compressed and/or bundled package such as but not limited to creating a solution package such as a Windows Solution Package (.wsp) file that includes the resources for a SharePoint product or products.

Creating the package can include one or more of the following: enumeration 206 of the files and data to be included in the package, transformation 208, token replacement 210, layout 212 and bundling and possibly the compression of the components into a solution package at 214. The created solution package can then be deployed onto one or more servers. Creating the package can also include a step preceding the enumeration step in which the package is validated as described above.

Enumeration 206 includes examining each of the files in the project and determining the files and data to be included in the solution package. In operation, enumeration may include traversing a package definition of one or more packages in a project to reach a feature reference, traversing the feature reference in the package to reach a feature, traversing a project item reference in the feature to reach a project item, traversing a file reference in the project item to reach a file. Well-known tree-traversal techniques can be used to determine a complete list of files and data to include in the solution package, (e.g., creating a manifest or master list of elements to be included in the package). Once the list of files and data for the package has been determined, the act of transformation 208 can commence. Transformation includes using the files determined in the enumeration step and data associated with the files, to generate one or more manifest files in a format that is compatible with the product packaging schema, mapping types and properties in the object model to elements and attributes in the manifest XML schemas.

At 210 token replacement is performed. Token replacement refers to a selection by the user of one set of a plurality of sets of provided variable names for use within one or more of the transformed files. The variable names that are replaced may represent values which are difficult or impossible for the user to know until the packaging process has begun. The variable names may refer to values which frequently change so that token replacement frees the user from updating the values manually. During the token replacement phase, a subset of the files included in the package are processed and replacement of variable names with variable values can be performed. In accordance with aspects of the subject matter disclosed herein, files with extensions matching a configurable list of extensions will have token replacement performed (e.g. *.xml, *.aspx, etc.). At 212, the layout step involves creating a preview of the structure of the package on disk. A hierarchy of directories is created and the enumerated and transformed files are placed in locations relative to the hierarchy. The layout step provides the user with an opportunity to perform additional customization. At 214 using the directory hierarchy and all the files in the directory hierarchy, elements of the package are bundled into one file. In accordance with some aspects of the subject matter disclosed herein, the file is compressed into the CAB compression format.

FIG. 2b illustrates an example of transformation including serialization and deserialization between files and object model. A definition file 230 such as a package definition file, or a feature definition file can be deserialized into objects in an object model 234. A manifest file 232 such as the manifest file created from the enumeration step above described with respect to FIG. 1a, can also be deserialized into objects in the object model 234. The object model 234, such as an object model for a software package as described above, can be acted upon by client components 236. Client components 236 can include designers such as the package designer and the feature designer described above and can also include a build engine such as but not limited to MSBuild.

When the objects in the object model 234 are changed via the designers, the objects so modified are serialized into the definition file 230 (e.g., *.feature and *.package files) when the object changes are saved in the designers. Once the object model 234 has been created, the transformation step of FIG. 2a can serialize the object model 234, and perform the transformation of step 208 of FIG. 2a on the deserialized object model. In accordance with aspects of the subject matter disclosed herein, the transformation process can include deserializing the definition file (e.g., using the DSL's proprietary XML format) into an instance of the object model, transforming the object model according to the packaging items enumerated in the previous act (adding the appropriate entries to the object model for each file included in the feature or package) and serializing the object model to a manifest file (e.g., using SharePoint's XML format). These actions can occur for each feature included in a package, as well as for the package itself. At this point the bundling and/or compression acts described above can be performed.

Example of a Suitable Computing Environment

Figure 3:
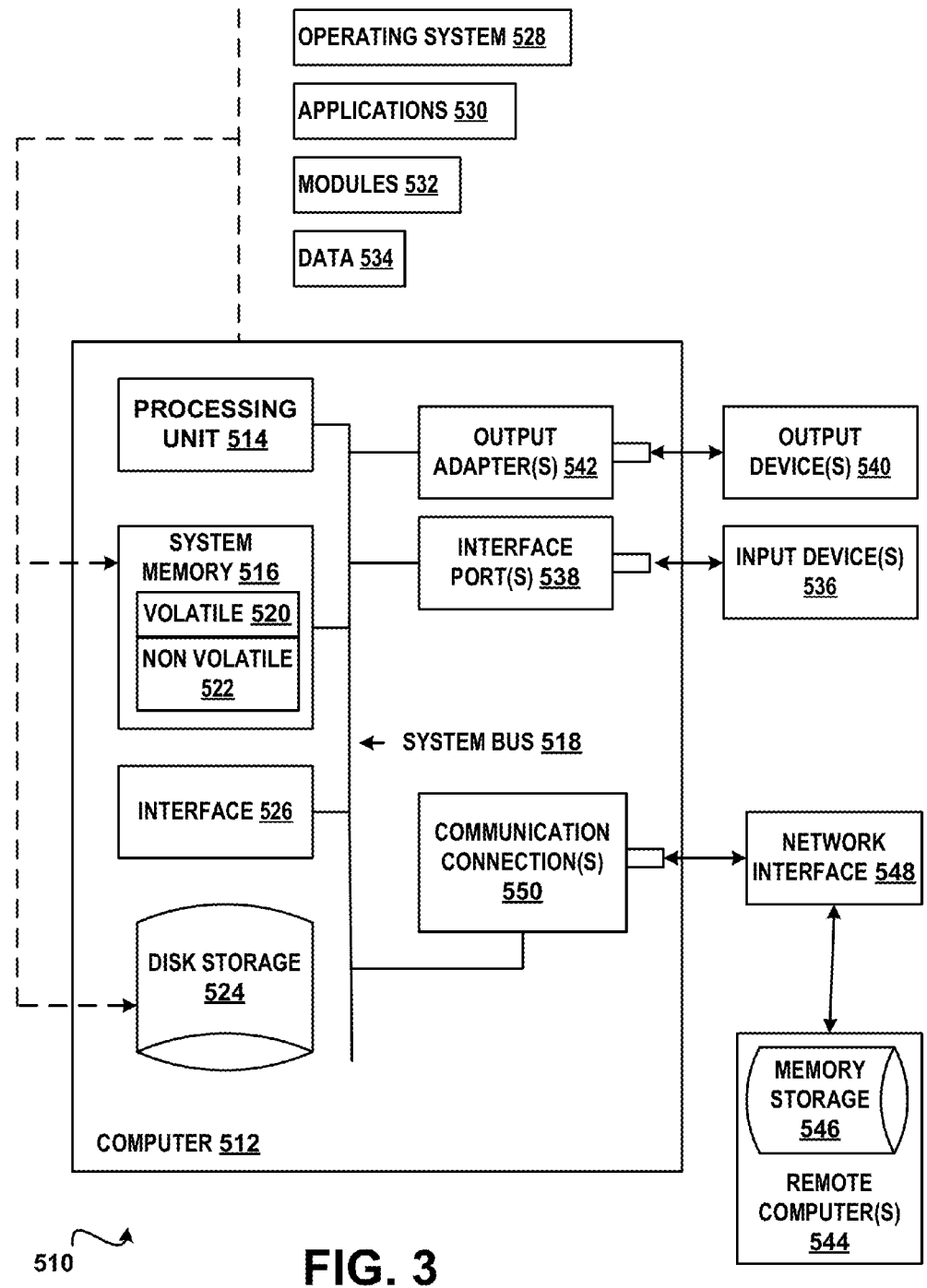
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for package design and generation in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory.

The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
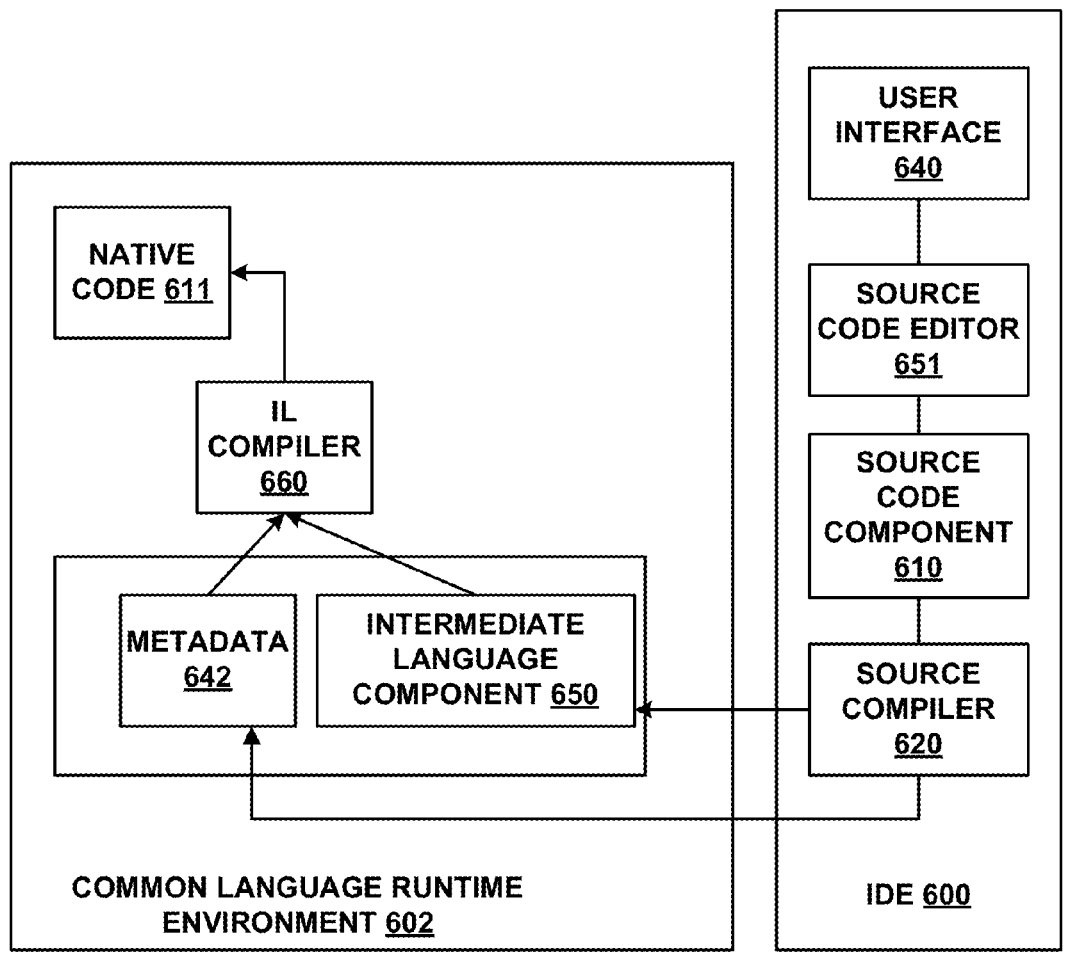
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. At a computer system, the computer system including a processor, a method of preparing an application for deployment, the method comprising:
    presenting the structure of an application package through an arrangement of one or more visual elements;
    altering the structure of the application package by altering application package element references associated with the arrangement of one or more visual elements;
    the processor transforming the altered structure of the application package into one or more manifest files by traversing the altered structure of the application package in accordance with the altered application package element references; and
    bundling the one or more manifest files into a deployment format expected by product deployment software.

2. The method of claim 1, further comprising previewing the altered structure of the application package by placing application package element references on a computer where the application is to be deployed.

3. The method of claim 2, further comprising checking the one or more manifest files for errors in accordance with a set of validation rules.

4. The method of claim 1, further comprising selecting a set of variables for use within the one or more manifest files.

5. The method of claim 1, further comprising presenting the structure of one or more application packages at an integrated development environment (IDE).

6. A system, the system comprising:
    one or more processors;
    system memory, the system memory storing executable instructions; and
    the one or more processors configured to execute the executable instructions to prepare an application for deployment, including the following:
    transform an altered structure of an application package into one or more manifest file by traversing the altered structure of an application package in accordance with altered application package element references, the altered structure of the application package having been altered from a structure of the application package presented through an arrangement of one or more visual elements, the altered structure of the application package having been altered by altering application package element references associated with the arrangement of one or more visual elements into the altered application package element references; and
    bundle the one or more manifest files into a deployment format expected by product deployment software.

7. The system of claim 6, further comprising the one or more processors configured to execute the executable instructions to check for errors preventing creation of a correct or working application based on a set of validation rules.

8. The system of claim 6, further comprising the one or more processors configured to execute the executable instructions to select a set of variables for use within the one or more manifest files.

9. The system of claim 6, further comprising the one or more processors configured to execute the executable instructions to present the structure of one or more application packages at an integrated development environment (IDE).

10. The system of claim 6, further comprising the one or more processors configured to execute the executable instructions to preview the altered structure of the application package by placing the defined elements in locations relative to a directory hierarchy on at least one computer where the application is to be deployed.

11. A system, the system comprising:
    one or more processors;
    a system memory, the system memory storing executable instructions; and
    the one or more processors configured to execute the executable instructions to prepare an application for deployment, including the following:
    present the structure of an application package through an arrangement of one or more visual elements;
    alter the structure of the application package by altering application package element references associated with the arrangement of one or more visual elements;
    transform the altered structure of the application package element manifest into one or more manifest files by traversing the altered structure of the application package in accordance with the altered application package element references; and
    bundle the one or more manifest files into a deployment format expected by product deployment software.

12. The system of claim 11, further comprising the one or more processors configured to execute the executable instructions to check for errors preventing creation of a correct or working application based on a set of validation rules.

13. The system of claim 11, wherein the one or more processors configured to execute the executable instructions to create an application package element manifest for the application comprise the one or more processors configured to execute the executable instructions to enumerate files and data that are to be used in the application.

14. The system of claim 11, further comprising the one or more processors configured to execute the executable instructions to select a set of variables for use within the one or more manifest files.

15. The system of claim 11, wherein the one or more processors configured to execute the executable instructions to bundle the identified application package elements into format compatible with product deployment software comprise the one or more processors configured to execute the executable instructions to compress a directory hierarchy into a file.

16. The system of claim 11, further comprising the one or more processors configured to execute the executable instructions to present the structure of one or more application packages at an integrated development environment (IDE).

17. The system of claim 11, further comprising the one or more processors configured to execute the executable instructions to preview the altered structure of the application package by placing application package element references on a computer where the application is to be deployed.

* * * * *